(12) United States Patent
Kambouris et al.

(10) Patent No.: US 7,014,928 B2
(45) Date of Patent: Mar. 21, 2006

(54) DIRECT CURRENT/DIRECT CURRENT CONVERTER FOR A FUEL CELL SYSTEM

(75) Inventors: Christos A. Kambouris, Commerce, MI (US); John T. Bates, Belleville, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 374 days.

(21) Appl. No.: 10/346,561

(22) Filed: Jan. 16, 2003

(65) Prior Publication Data
US 2003/0157379 A1 Aug. 21, 2003

Related U.S. Application Data

(60) Provisional application No. 60/319,071, filed on Jan. 16, 2002.

(51) Int. Cl.
*H01M 8/00* (2006.01)
(52) U.S. Cl. .............................. 429/12; 429/13; 429/22
(58) Field of Classification Search .................. 429/12, 429/13, 22
See application file for complete search history.

(56) References Cited

U.S. PATENT DOCUMENTS

| 5,519,312 A | 5/1996 | Wang et al. ................. 323/360 |
| 6,858,335 B1 * | 2/2005 | Schmidt et al. ............... 429/13 |

OTHER PUBLICATIONS

Nergaard et al., "Ripple Reduction for High Power Fuel Cell Converter Applications," in *Proceedings of the Center for Power Electronics Systems (CPES) Annual Seminar*, 2001.

\* cited by examiner

*Primary Examiner*—Dah-Wei Yuan
(74) *Attorney, Agent, or Firm*—Seed IP Law Group PLLC

(57) ABSTRACT

Fuel cell systems and control methods including a fuel cell and a second energy source, such as a battery that is adapted to supplement the fuel cell. In addition, the fuel cell system utilizes a single bipolar switching module, such as an IGBT six pack module that is configured to implement a DC/DC converter, such as a DC/DC boost converter, for both the fuel cell and the battery. The fuel cell system also makes use of a controller that is configured to control either or both of input current and output voltage of the DC/DC converter.

15 Claims, 2 Drawing Sheets

DIRECT CURRENT/DIRECT CURRENT CONVERTER FOR A FUEL CELL SYSTEM

This Application is a non-provisional of 60/319,071 filed Jan. 16, 2002.

BACKGROUND OF THE INVENTION

1. Field of the Invention

The present fuel cell systems and control methods relate generally to direct current-to-direct current (DC/DC) converters, and more particularly to using a DC/DC converter with both a fuel cell and a second energy source.

2. Description of the Related Art

In an application utilizing an energy source, such as a fuel cell, the quality of power or the regulation of the direct current (DC) bus is an issue. For example, a fuel cell is typically not able to respond immediately to peaks in demand. A further issue in such an application is that the fuel cell may be subject to power outages which are unacceptable in an uninterruptible power supply (UPS) application. There is a present need to address those issues, utilizing as many of the components of an existing power converter to implement a DC/DC converter with existing hardware and with as few alterations and additions to the existing hardware as possible.

BRIEF SUMMARY OF THE INVENTION

In one aspect, fuel cell systems and control methods utilizing a fuel cell with a second energy source, such as a battery, to supply load leveling capability and back up power capability are provided. In another aspect, a single bipolar switching device, such as a single IGBT module, is used in the DC/DC conversion for both the fuel cell and the second energy source.

In a further aspect of the present fuel cell systems and control methods, a DC/DC converter with independent control of DC/DC converter input current and output voltage is used, which increases system efficiency.

In an additional aspect of the present fuel cell systems and control methods, a fuel cell system with a second energy source and utilizing a DC/DC converter with improved output voltage regulation is utilized.

An embodiment of the present fuel cell systems and control methods provides a DC/DC converter that utilizes one leg of an insulated gate bipolar transistor (IGBT) six pack module to provide bi-directional DC/DC conversion between a battery pack and an inverter DC bus. The other two legs of the IGBT six pack module provide DC/DC conversion between a fuel cell and the inverter DC bus. This achieves optimization of best use of the power stage to provide lower system cost topologies by utilizing the IGBT six pack module configuration. The battery pack can also supply power during fuel cell outages. One or two legs of the IGBT six pack module can be added in parallel to the battery leg by using a contactor or switch to increase power conversion capability.

Another embodiment of the present fuel cell systems and control methods includes, for example, a fuel cell and a second energy source, such as a battery or battery pack, that is adapted to supplement the fuel cell. The battery can supplement the fuel cell, for example, by delivering battery power for a load when fuel cell power available from the fuel cell energy source is insufficient for a load power demand, and/or by serving as a primary back-up energy source when the fuel cell is down, and/or by absorbing power when the power generated by the fuel cell exceeds a load power demand. In addition, an embodiment of the present fuel cell systems and control methods utilizes a single bipolar switching module, such as an IGBT six pack module, that is configured to implement a DC/DC converter, such as a DC/DC boost converter, for both the fuel cell and the battery. The DC/DC boost converter is adapted to boost DC voltage from both the fuel cell and the second energy source to a DC bus capacitor bank and load. In one aspect of the present fuel cell systems and control methods, another IGBT six pack module is also used as a component of a back end inverter coupled to the DC/DC converter.

The IGBT six pack module has, for example, three IGBT legs that are configured to boost the DC voltage from the fuel cell and the battery to the DC bus capacitor bank and load. In addition, one of the three IGBT legs of the module is configured to provide for bi-directional DC/DC conversion for the battery. A first switch (alternatively referred to herein as a contactor) is adapted to connect the other two of the three IGBT legs to the battery to provide two additional DC/DC converter legs to the battery for a high power load. The first switch is also adapted for switching to a fuel cell position to provide two legs of the IGBT six pack module to boost the fuel cell voltage when the fuel cell is the primary energy source. A second switch (alternatively referred to herein as a contactor) is adapted to disconnect the battery from the DC/DC converter.

The present fuel cell systems and control methods also make use of a controller that is configured to control either or both of input current and output voltage of the DC/DC converter. The controller is configured to control the input current of the DC/DC converter by controlling a duty cycle of two fuel cell legs of the IGBT six pack module. The controller is configured to control the output voltage of the DC/DC converter by controlling a battery pack leg of the IGBT module and employing a bi-directional capability of the IGBT module. In addition, the controller is configured to simultaneously control either or both of the input current and output voltage of the DC/DC converter by controlling a flow of power to and from the battery to maintain an average state of charge of the battery, whereby the battery can deliver or absorb a required level of power.

Additional objects, advantages and novel features of the present fuel cell systems and control methods will be set forth in part in the description which follows, and in part will become more apparent to those skilled in the art upon examination of the following, or may be learned by practice of the invention.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a through understanding of various embodiments of the invention. However, one skilled in the art will understand that the invention may be practiced without these details. In other instances, well-known structures associated with electrical circuits and circuit elements have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Figure 1A:
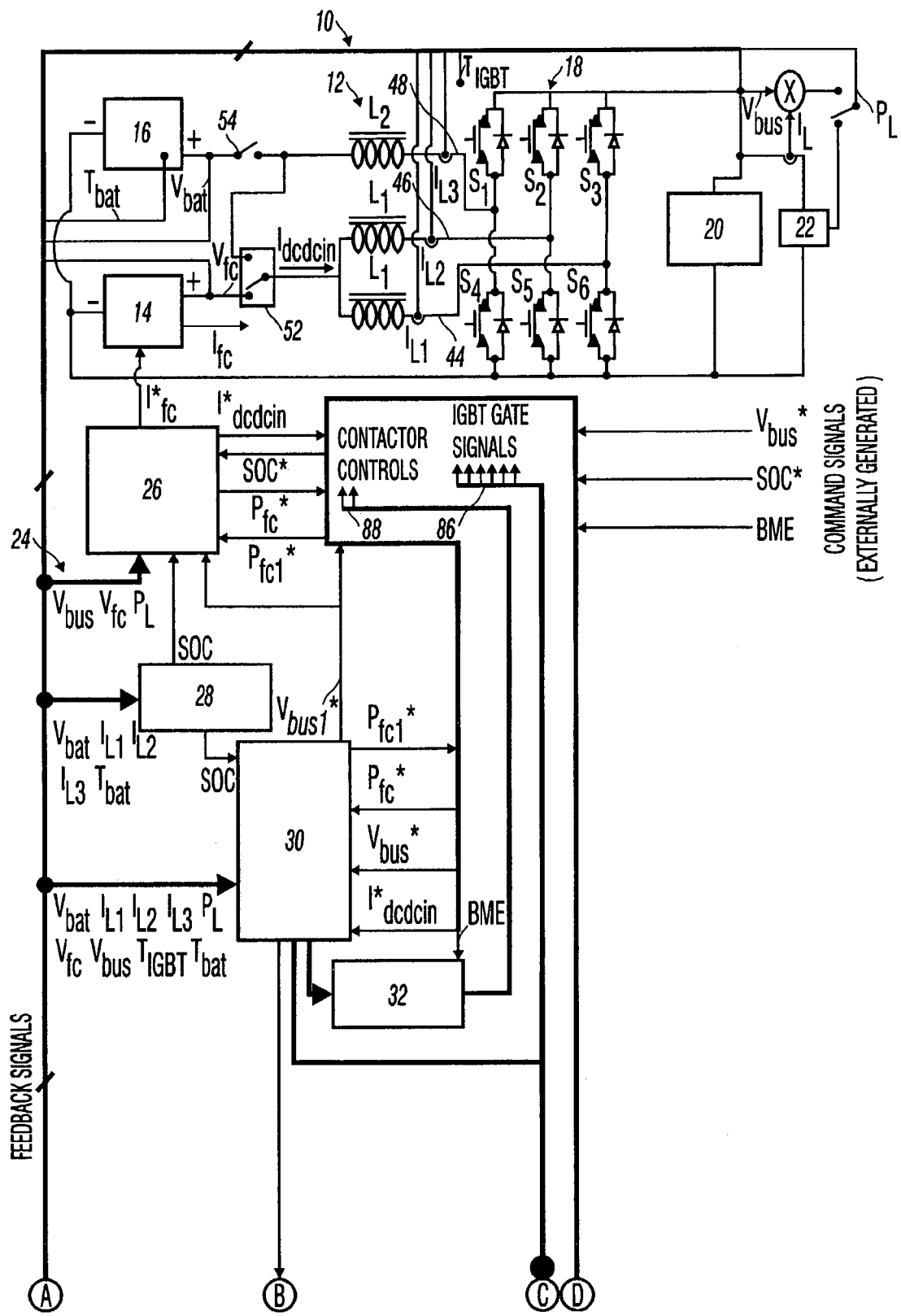
FIGS. 1A and 1B are a schematic diagram that illustrates an example of a circuit and a control scheme for an embodiment of the present fuel cell systems and control methods.
Figure 1B:
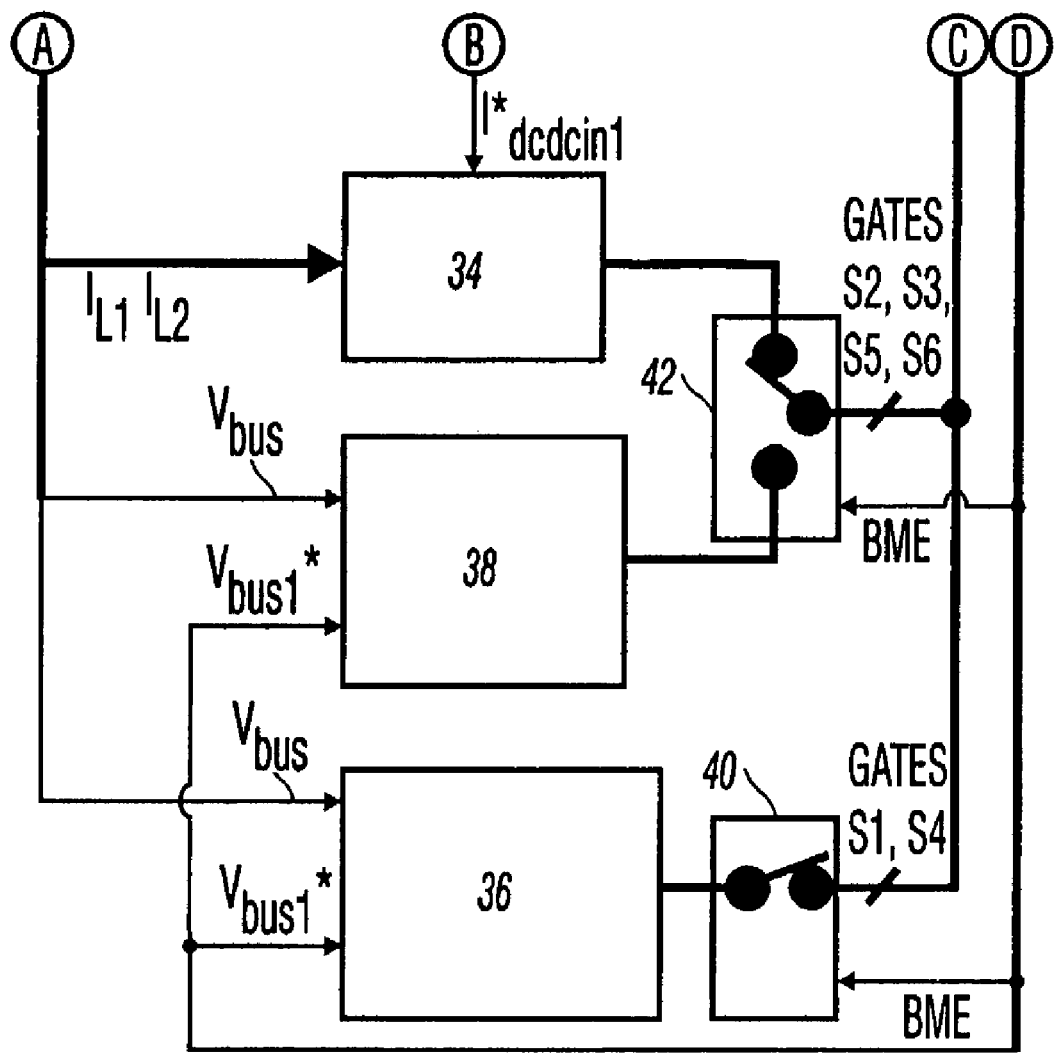

Referring now in detail to an embodiment of the fuel cell systems and control methods, an example of which is illustrated in the accompanying drawings, FIGS. 1A and 1B illustrate a circuit and control scheme for a fuel cell system 10 utilizing a DC/DC converter 12. System 10 includes, for example, a fuel cell 14, a battery pack 16, an IGBT six pack module 18, a capacitor bank (or DC bus) 20, and a load 22. A DC/DC converter controller 24 of the system includes, for example, a power controller 26, a battery state of charge (SOC) estimator 28, fault protection 30 including battery overcharge, overvoltage and overcurrent protection, contactor controls 32, a fuel cell DC/DC input current controller 34, DC bus voltage controllers 36, 38 (for normal operating mode and battery backup operating mode, respectively), and IGBT gate controls 40, 42.

An embodiment of the present fuel cell systems and control methods involves a unique way of using a single IGBT module 18 in the DC/DC conversion for both battery 16 and fuel cell 14, and using battery 16 to supply a load leveling capability and back up power capability. DC/DC converter 12 makes use, for example, of three IGBT legs 44, 46, 48 to boost the DC voltage from fuel cell 14 and battery 16 to DC bus 20 and load 22.

It is to be noted that without battery 16, it is not possible to simultaneously control both DC/DC converter input current $I_{dcdcin}$ and output voltage, and that control of DC/DC converter input current $I_{dcdcin}$ is important to maximize the fuel cell efficiency. Fuel cell 14 tells DC/DC converter 12 how much current it can source based on the amount of fuel that fuel cell 14 is delivering to its stack. If DC/DC converter 12 pulls more than this amount of current then the fuel cells (referred to collectively herein as fuel cell 14) may "starve" and damage may occur. On the other hand, if DC/DC converter 12 pulls less than the available current, the excess fuel delivered to the cells of fuel cell 14 will be wasted. Hence, control of DC/DC converter input current $I_{dcdcin}$ is important for several reasons.

Aspects of the present fuel cell systems and control methods include, for example, supplementing or introducing a second source of energy and having two sources of energy and also implementing DC/DC converter 12 with existing hardware. One of the two energy sources is fuel cell 14, and the other is battery 16, and the fuel cell is supplemented with the battery pack energy source. The quality of power or the regulation of DC bus 20 is addressed by using battery 16. Fuel cell 14 is not as fast as battery 16 in its ability to deliver energy to load 22. Battery 16 is faster, so battery 16 is used as a way to deliver small amounts of power in fast response to a spike in demand. In this way, the quality of the power is improved.

An embodiment of the present fuel cell systems and control methods enables utilizing existing hardware to implement both the DC/DC conversion for fuel cell 14 and the DC/DC conversion for battery 16. That aspect involves using IGBT module 18. Currently, different modules may be used, such as one module for a fuel cell DC/DC converter and a separate module for a battery DC/DC converter. In one embodiment, IGBT module 18 used as a component of a back end inverter to be connected to the fuel cell DC/DC converter is used to build a battery pack DC/DC converter. Thus, this aspect of the present fuel cell systems and control methods uses one IGBT module 18 in DC/DC converter 12 for both battery 16 and fuel cell 14, as opposed to having separate modules.

IGBT module 18 is used to implement both the fuel cell DC/DC conversion and the battery DC/DC conversion, and in a further aspect of the present fuel cell systems and control methods, battery 16 is used as a supplement to fuel cell 14 to improve the voltage regulation on DC bus 20. Battery 16 also can be used, for example, for power outages on fuel cell 14. Battery 16 can deliver back-up power by itself. For example, battery 16 can be used in an uninterruptible power supply (UPS) application. Battery 16 can deliver full power for a brief period of time in situations where fuel cell 14 may be down.

Regulation of DC/DC converter output voltage may be required if load 22 requires a regulated voltage. If load 22 is an inverter, for example, then voltage regulation is advantageous in that it can reduce inverter output harmonics, and system performance can be optimized with respect to the voltage of DC bus 20.

When fuel cell 14 is the primary energy source, a first switch or contactor 52 is switched to the fuel cell position, as shown in FIGS. 1A and 1B, providing two IGBT legs 44, 46 to boost the voltage of fuel cell 14. The duty cycle of the IGBT legs 44, 46 being used for the fuel cell 14 can be controlled to regulate DC/DC converter input current $I_{dcdcin}$. The remaining IGBT leg 48 is given to battery 16 for bi-directional DC/DC conversion. With bi-directional capability, battery 16 can supply energy (battery discharge) and take away energy (battery charging) from DC bus 20 and/or load 22. The process of supplying energy tends to increase the converter output voltage, whereas the process of taking away energy tends to decrease the converter output voltage. Hence the IGBT leg 48 being used for the battery 16 can be controlled to regulate the converter output voltage.

Typically, a battery has a higher power bandwidth than a fuel cell. In other words, battery 16 can respond faster to changing power requirements than fuel cell 14. Fuel cell 14 is slower to respond due to the limited bandwidth of its fuel delivery system, such as compressor, valves, and the like. In addition, battery 16 is capable of both sourcing and sinking energy, whereas fuel cell 14 is only capable of sourcing energy. Given these facts, an embodiment of the present fuel cell systems and control methods supplements fuel cell 14 with the sourcing and sinking capabilities of battery 16 to achieve a better overall energy source than fuel cell 14 by itself.

Given the limited power bandwidth of a fuel cell, fuel cell 14 may not be able to react fast enough to a heavy load 22 at startup. In this case, the power from capacitor bank 20 to load 22 exceeds the power from fuel cell 14 to capacitor bank 20. As a result, the voltage of capacitor bank 20 drops until the power of fuel cell 14 can catch up to load 22 power demand. By adding battery 16 with sufficient capacity, the difference between load 22 power and the power of fuel cell 14 can be supplied by battery 16, and as a result the voltage of capacitor bank 20 will not drop. On the other hand, consider a case in which load 22 power demand suddenly drops, as in a load 22 dump. Without battery 16, the power from load 22 has no place to go except to capacitor bank 20, since fuel cell 14 cannot sink power. When capacitor bank 20 absorbs power, its voltage increases. Battery 16 can absorb the power at load 22 dump and, hence, maintain the voltage of capacitor bank 20.

In addition to DC bus voltage regulation, battery 16 can also serve as the primary energy source when fuel cell 14 is down. This is useful in UPS applications where uninterruptible power must be delivered to load 22. The amount of time that battery 16 can supply power to load 22 depends on such factors as load 22 power demand and the amp-hour capacity of battery 16. For a high power load 22, first switch 52 can be switched to battery 16 to provide additional IGBT legs 44, 46 to battery 16. A second switch or contactor 54 is provided in order to disconnect battery 16 in case of servicing or under certain fault conditions.

Another aspect of the present fuel cell systems and control methods involves the control scheme, given the complexity of systems that utilize two sources of energy. Various feedback signals are provided for the control scheme. Referring again to FIGS. 1A and 1B, the inputs and outputs for DC/DC converter controller 24 include a number of feedback signals, such as the DC bus voltage $V_{bus}$, the battery output voltage $V_{bat}$, the fuel cell output voltage $V_{fc}$, the converter leg currents $I_{L1}$, $I_{L2}$, $I_{L3}$, the load power $P_L$, the battery temperature $T_{bat}$, and the IGBT temperature $T_{IGBT}$. Other inputs and outputs for DC/DC converter controller 24 include command/setpoint signals, such as the DC bus setpoint voltage $V_{bus}^*$, the battery state of charge setpoint SOC*, the fuel cell output power setpoint $P_{fc}^*$, the fuel cell output current setpoint $I_{fc}^*$, and the DC/DC converter input current setpoint $I^*_{dcdcin}$. An additional DC/DC converter controller signal is the battery mode enable signal BME. (After fault protection 30, the set points are represented in FIGS. 1A and 1B as $V_{bus1}^*$, $P_{fc1}^*$, etc.)

The input inductor current feedback—converter leg currents $I_{L1}$, $I_{L2}$, $I_{L3}$—is required for input current controller 34 and overcurrent fault protection 30. The converter output voltage feedback—DC bus voltage $V_{bus}$—is required for DC bus voltage controllers 36, 38 and overvoltage fault protection 30. The fuel cell output voltage $V_{fc}$ and battery voltage feedback—battery output voltage $V_{bat}$—are required for overvoltage fault protection 30 and input inductance estimation for control purposes. IGBT temperature $T_{IGBT}$ and battery temperature $T_{bat}$ feedback are required for overtemperature fault protection 30. Battery state of charge feedback SOC* is required for controlling the proper amount of power flow from battery 16 in conjunction with the power flow from fuel cell 14.

If, on the one hand, battery 16 is fully charged, battery 16 will have very limited capability to absorb power and, hence, output voltage regulation may degrade. On the other hand, if battery 16 is nearly completely discharged, battery 16 will have very limited capability to supply power to load 22 and, again, output voltage regulation may suffer. The flow of power to and from battery 16 is controlled, so that the average state of charge is such that under most conditions battery 16 can source or sink the required power. As shown in FIGS. 1A and 1B, the control setpoints are converter input current setpoint $I^*_{dcdcin}$ and output voltage DC bus setpoint voltage $V_{bus}^*$. The controller outputs are the gating signals 86 to turn the IGBTs on and off. The other outputs are the contactor controls 88 for backup operation, fault operation, and general disconnect for power down.

All of the above U.S. patents, U.S. patent application publications, U.S. patent applications, foreign patents, foreign patent applications and non-patent publications referred to in this specification and/or listed in the Application Data Sheet, including, but not limited to U.S. Ser. No. 60/319,071, filed Jan. 16, 2002, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A fuel cell system, comprising:
    a fuel cell;
    a battery configured to supplement the fuel cell;
    an insulated gate bipolar transistor (IGBT) six pack module configured to implement a DC/DC converter for both the fuel cell and the second energy source; and
    a controller configured to control at least one of an input current and an output voltage of the DC/DC converter, wherein the IGBT six pack module comprises three IGBT legs configured to boost a DC voltage from the fuel cell and the battery to a DC bus capacitor bank and a load.

2. The system of claim 1, wherein a first IGBT leg is configured to provide bi-directional DC/DC conversion for the battery.

3. The system of claim 2, further comprising a first switch adapted to selectively connect a second and a third IGBT leg to the battery to provide DC/DC conversion for the battery via all three IGBT.

4. The system of claim 3, wherein the first switch is adapted to selectively connect the second and the third IGBT legs to the fuel cell to provide DC/DC conversion for the fuel cell via the second and the third legs.

5. The system of claim 3, further comprising a second switch adapted to selectively disconnect the battery from the DC/DC converter.

6. A fuel cell system, comprising:
    a fuel cell;
    a battery configured to supplement the fuel cell;
    an insulated gate bipolar transistor (IGBT) six pack module configured to implement a DC/DC converter for both the fuel cell and the second energy source; and
    a controller configured to control at least one of an input current and an output voltage of the DC/DC converter, wherein the IGBT six pack module comprises at least two IGBT legs configured to provide DC/DC conversion for the fuel cell, and wherein the controller is configured to control the input current of the DC/DC converter by controlling a duty cycle of the at least two IGBT legs.

7. The system of claim 6, wherein the IGBT six pack module comprises a third IGBT leg configured to provide bi-directional DC/DC conversion for the battery, and wherein the controller is further configured to control the output voltage of the DC/DC converter by controlling the third IGBT leg.

8. A method of controlling a fuel cell system comprising a fuel cell, a battery, an insulated gate bipolar transistor (IGBT) six pack module with three IGBT legs, and a controller, the method comprising:
    operating the IGBT six pack module as a DC/DC converter for both the fuel cell and the battery;
    using the controller to control at least one of an input current and an output voltage of the DC/DC converter; and operating the IGBT six pack module to boost a direct current (DC) voltage from the fuel cell and the battery to a DC bus capacitor bank and a load; and providing bi-directional DC/DC conversion for the battery via a first IGBT leg.

9. The method of claim 8, wherein the method further comprises selectively connecting a second and a third IGBT leg to the fuel cell in a first mode, and all three IGBT legs to the battery in a second mode.

10. The method of claim 9, wherein selectively connecting a second and a third IGBT leg to the fuel cell in a first mode, and all three IGBT legs to the battery in a second mode comprises adjusting a first switch.

11. The method of claim 9, wherein the method further comprises selectively disconnecting the battery from the DC/DC converter.

12. The method of claim 11, wherein selectively disconnecting the battery from the DC/DC converter comprises adjusting a second switch.

13. A method of controlling a fuel cell system comprising a fuel cell, a battery, a bipolar switching module with at least two insulated gate bipolar transistor (IGBT) legs, and a controller, the method comprising:

operating the bipolar switching module as a DC/DC converter for both the fuel cell and the battery;

using the controller to control at least one of an input current and an output voltage of the DC/DC converter;

providing DC/DC conversion for the fuel cell via the at least two IGBT legs; and operating the controller to control the input current of the DC/DC converter by controlling a duty cycle of the at least two IGBT legs.

14. The method of claim 6, wherein the IGBT six pack module further comprises a third IGBT leg and wherein the method further comprises:

providing bi-directional DC/DC conversion for the battery via the third IGBT leg; and, operating the controller to control the output voltage of the DC/DC converter.

15. The method of claim 14, wherein operating the controller to control the output voltage of the DC/DC converter comprises controlling the third IGBT leg.

* * * * *